Oct. 16, 1934.  F. P. HAWKINS  1,977,128
HARD FACING
Filed Sept. 22, 1932
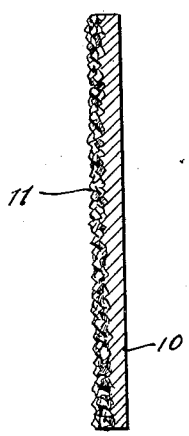
Fig. 1.
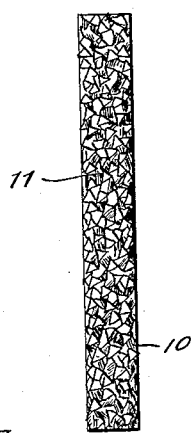
Fig. 2.
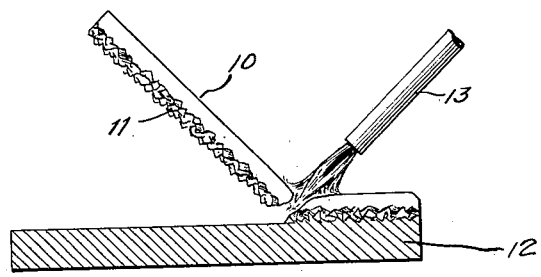
Fig. 3.
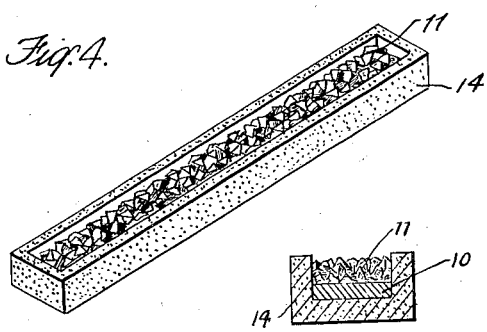
Fig. 4.
Fig. 5
INVENTOR
FREDERICK P. HAWKINS
BY
ATTORNEY Patented Oct. 16, 1934

1,977,128

UNITED STATES PATENT OFFICE 1,977,128

HARD FACING

Frederick P. Hawkins, Kokomo, Ind., assignor to Haynes Stellite Company, a corporation of Indiana Application September 22, 1932, Serial No. 634,385

12 Claims. (Cl. 219—8)

The invention relates to the deposition of metals by thermal fusion, through the use of a high-temperature gas flame, an electric arc or a similar source of heat. More specifically, the invention provides a new and useful composite welding rod, an improved process for manufacturing composite welding rod, and a new method of hard facing metal surfaces.

It is the chief object of the invention to provide a new and improved welding rod adapted for use in applying a deposit containing a comparatively hard metal or alloy such as tungsten carbide and a comparatively soft metal or alloy such as steel, whereby a hard and strong wear-resistant deposit is formed. Other objects and the novel features of the invention will be apparent from the following description and the accompanying drawing, in which Figure 1 is a cross-section of a typical welding rod embodying the invention, Figure 2 is a plan view of the rod shown in Figure 1, Figure 3 illustrates one method of welding wherein the rod of Figures 1 and 2 is used according to the method of the invention, Figure 4 shows a suitable mold for use in manufacturing the rod illustrated by Figures 1 and 2, and Fig. 5 is a cross-section of the mold shown in Figure 4.

An improved welding rod according to the invention is made in the following manner: Referring to Figures 4 and 5 of the drawing, a plain flat relatively thin strip of metal 10 is placed in a mold 14 which fits fairly closely to the bottom face and four edges of the strip 10. A layer of comminuted hard metal 11 is then evenly distributed on the top face of the strip 10. A small quantity of a suitable metal-containing flux is then distributed on top of the metal 11. The mold 14 and its contents are then heated in a substantially nonoxidizing atmosphere at a suitable temperature such that the flux fuses and securely binds the hard metal 11 to the base metal 10. The metal-containing flux usually forms a partial matrix for the hard metal 11. Neither the base metal 10 nor the hard metal 11 are permitted to rise to a temperature higher than a temperature of incipient or superficial fusion. The base metal strip 10 and the particles of hard metal 11 thus retain substantially their original forms throughout the process of manufacture.

In the process of manufacture described above, the mold 14 may consist of any suitable material, graphite being preferred. Any heating means may be used in which a sufficiently high temperature and at least a moderately non-oxidizing atmosphere are obtainable. To bond tungsten carbide to steel, using a flux similar to that mentioned below, a gas-fired muffle furnace and a temperature of 2300°–2500° F. are suitable.

A metal-containing flux, of which the following composition is an example, is an excellent flux, particularly for binding tungsten carbide to steel:

20% semi-steel chips, 16–30 mesh.
60% manganese, finer than 16 mesh.
10% ferrosilicon, finely crushed.
5% fused borax, finer than 30 mesh.
5% burned lime, finer than 30 mesh.

When this flux is applied as described it will be fused by heating the mold and the metals therein at a temperature of about 2350° F. for approximately three minutes. Other suitable fluxes may be used without departing from the spirit of the invention.

The essentials of the process for making welding rods thus comprise the steps of placing a comminuted hard metal together with a metal-containing flux on a strip of relatively softer metal and heating the whole in a substantially non-oxidizing atmosphere at a temperature sufficient to fuse the metal-containing flux and cause it to wet the surfaces of the hard and soft metals, but insufficient to melt more than superficially either the said hard metal or the said softer metal. The details of the process may be varied considerably without departing from these essentials.

Figures 1 and 2 illustrate the welding rod of the invention, and show the hard metal 11 evenly distributed along and bound to one surface of the soft metal 10. While the use of tungsten carbide as the hard metal 11 has been emphasized, it is evident that the strip 10 may be similarly coated with adherent particles of any metal, alloy or compound which is of comparable hardness and which is wet by the metal-containing flux. For example, the carbides, silicides, borides and nitrides of tungsten, molybdenum, chromium, vanadium, columbium, tantalum and the like are suitable.

The softer metal 10 may be a steel or other alloy which is adapted to deposition by fusion welding methods. A simple carbon steel may be used, or an alloy steel such as that described in U. S. Patent 1,333,151 issued to F. M. Becket.

For special purposes, other suitable alloys include those described in U. S. Patents 1,057,423; 1,057,828 and 1,150,113 to Elwood Haynes, U. S. Patent 1,671,417 to R. Franks, and U. S. Patents 1,002,995 and 1,774,862 to W. A. Wissler.

In choosing the materials of the new rod, it is important to keep in mind the fact that the hard material must have a melting point sufficiently higher than that of the softer material so that the former will remain in the form of discrete particles during the welding operation.

Many advantages are inherent in the structure of the welding rod of the invention. These include the advantage that the base of softer metal is not melted during fabrication and therefore is not alloyed with or contaminated by the hard metal during fabrication, the hard metal particles are firmly secured to the softer metal and do not tend to drop off during the welding operation, and that the hard metal is surface-alloyed with flux. These and other advantages also increase the ease with which a uniform deposit may be made, as will be described hereinbelow.

While many of the known methods of welding may be used in applying the improved welding rod, the method of the present invention has special advantages and will be described in connection with Figure 3 of the drawing. The surface of a metal article 12 on which a hard deposit is to be made is preheated on the surface to a welding temperature. The welding rod is then juxtaposed to the surface of the article 12, the rod face which carries the hard metal 11 being towards the article 12. A source of welding heat, for instance a reducing oxy-acetylene flame from a torch 13, is then applied; the more intense heat being directed principally against the plain side of the softer metal 10 of the rod, as shown. A composite deposit of uniform thickness and composition is thereby secured. Aside from the uniformity of the deposit, it is an important feature of this method that the welding flame, electric arc or other source of heat is not directed upon the hard metal, but is confined chiefly to the softer metal. Where the hard metal is a carbide or nitride this feature is valuable, for metal carbides and nitrides are deleteriously affected by high temperatures. The presence of the flux on the hard metal also aids materially in the deposition of the metal without overheating.

The improved welding rod is especially adapted for applying hard wear-resistant facings to tools such as well-drilling bits and the like, but many other uses will be apparent to those skilled in this art.

I claim:

1. Composite welding rod comprising comminuted hard metal secured to one surface of a strip of softer metal.

2. Composite welding rod comprising comminuted hard metal carbide secured by metal-containing flux to one surface of a strip of softer metal.

3. Composite welding rod comprising a flat strip of metal having a plain face and a layer of particles of metal harder than said strip united to and evenly distributed along the other face of said strip.

4. Composite welding rod comprising a plain flat strip of steel having a plain flat face and a layer of tungsten carbide particles united by a ferrous-metal-containing flux to and evenly distributed along the other face of said strip.

5. Process for manufacturing composite welding rod which comprises placing comminuted hard metal together with a flux on one surface of a strip of comparatively soft metal and heating the metals at a temperature sufficiently high to melt the flux and thereby bind the hard metal to the soft metal.

6. Process for manufacturing composite welding rod which comprises placing comminuted hard metal chosen from the group consisting of the carbides and nitrides of tungsten, molybdenum, chromium, vanadium, columbium and tantalum, together with a metal-containing flux on one surface of a comparatively soft metal and heating the metals in a non-oxidizing atmosphere at a temperature sufficiently high to melt the flux and thereby bind the hard metal securely to the soft metal, but insufficiently high to melt more than superficially either the hard metal or the soft metal.

7. Process for manufacturing composite welding rods which comprises placing comminuted tungsten carbide together with a flux in a layer on a strip of steel and heating the said metals at a temperature sufficient to melt the flux and thereby bind the tungsten carbide securely to the steel but insufficient to melt the steel more than superficially.

8. Method of welding which comprises juxtaposing a metal surface and the hard-metal surface of a welding rod consisting of a soft metal strip having hard metal on one of its surfaces, and applying a welding heat to the soft-metal surface of said strip.

9. Method of securing hard metal particles to the surface of a metal article which comprises uniting a layer of said particles to one face only of a strip of metal materially softer than said particles, applying a welding heat to said surface and to said strip while the particle-carrying face of said strip is disposed opposite said surface, and depositing the particles and strip on said surface.

10. Method of securing tungsten carbide particles to the surface of a metal article which comprises uniting with a ferrous-metal-containing flux a layer of said particles to one face only of a strip of steel, applying a reducing oxy-acetylene flame to said surface and to the plain face of said strip while the particle-carrying face of the strip is disposed opposite said surface, and depositing the particles and strip on said surface.

11. Composite welding rod comprising a flat strip of steel and a layer of comminuted metal harder than steel firmly united to one surface only of said strip.

12. Method of securing hard metal particles to the surface of a metal article which comprises providing a composite welding rod consisting of a metal strip having a layer of said hard metal particles firmly united to one face only of said strip; applying welding heat to the surface of said article and to the soft-metal surface of the said rod while the particle-carrying face of the rod is apposed to the said surface of the article, whereby the said metal strip is melted; and simultaneously depositing the molten metal and hard particles on the heated surface of the article.

FREDERICK P. HAWKINS.